United States Patent Office 3,086,970
Patented Apr. 23, 1963

3,086,970
PURIFICATION OF WATER-SOLUBLE METHYL-HESPERIDINS CONTAINING CHALCONE TYPE IMPURITIES
Ikuo Sakieki and Hiroaki Nomura, Yamaguchi, Japan, assignors to Takeda Pharmaceutical Industries, Ltd., Higashi-ku, Osaka, Japan
No Drawing. Filed July 24, 1959, Ser. No. 829,221
Claims priority, application Japan July 30, 1958
5 Claims. (Cl. 260—210)

The present invention relates to the purification of water-soluble methylhesperidins which contain chalcone type impurities.

In 1936, L. B. Armentano and Szent-Györgyi et al. succeeded in extracting citrin from lemon juice and designated it as vitamin P (Deutsch. Med. Woschr. 62, 1325 [1936]). Later it was clarified that the vitamin P effect of the substance is attributable to hesperidin which is the main principle thereof. C. W. Wilson has succeeded in obtaining methylated hesperidin chalcone through a path wherein hesperidin is first treated with concentrated alkali solution to produce its chalcone and the product is then methylated with dimethyl sulfate (U.S. Patents 2,425,291 and 2,615,015). The methylated hesperidin chalcone is stable in a wide pH range and its excellent medicinal effect was recognized by Bohr et al. (J. Pharmacol. 92, 243 [1949]). But this compound has a shortcoming that its toxicity is relatively strong.

To overcome this disadvantage, Ikuo Sakieki—one of the co-applicants here—was able to prepare water-soluble methylhesperidins which are representable by the formula

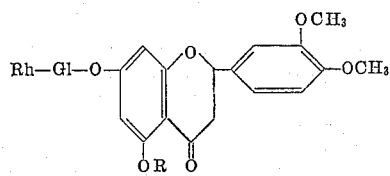

wherein R is hydrogen or methyl radical, Rh is rhamnose or methylrhamnose and Gl is glucose or methylglucose, by a process wherein hesperidin is methylated under conditions such that the formation of methylated hesperidin chalcone is substantially inhibited. In the foregoing formula, the methylrhamnose and/or methylglucose may have their methyl radical at any position and the number of the methyl radicals is not limited. Such method, briefly stated, involves methylating the starting hesperidin with a methylating agent, such as dimethyy sulfate, methyl halides and diazomethane, in the presence of an alkaline agent, such as an hydroxide or carbonate of an alkali metal or an alkaline earth metal—the quantity of alkaline agent present during the methylation being not in excess of 5 mols per mol of the hesperidin, and the reaction temperature being below room temperature (about 20–25° C.) and preferably below 10° C. The said methylation, moreover, is advantageously carried out in a solvent, such as water or a water-immiscible organic solvent such as acetone or dioxane. Best results are obtained when using one mol of methylating agent per mol of the hesperidin, and calcium hydroxide is the preferred alkaline agent. The resultant product of the thus-outlined process is a mixture of various impurities besides water soluble methylhesperidins and a small amount of methylated hesperidin chalcone. The methylhesperidins thus produced can be separated in per se conventional manner, e.g. by salting out, dialysis, organic solvent extraction, separation with the aid of an ion exchanger, distribution between two solvents, etc. Thus, an aqueous solution of the mixture of products may be saturated with sodium chloride, whereupon the water-soluble methylhesperidins are separated out almost completely, the undesired impurities remaining in the aqueous solution. The several methylhesperidins can then be separated from each other, for example by adsorption chromatography in per se conventional manner or by a conventional counter-current distribution process, etc. Each of the methylhesperidins, for example, 3'-methyl-7-(methylrhamnosyl-2-methylglucosyl)-hesperidin, 3'-methyl-7-(rhamnosyl - 2-methylglucosyl)-hesperidin, 3'-methyl-hesperidin, 3',5-dimethylhesperidin, mixtures of these, etc. has a vitamin P-like (citrin-like) activity and may therefore be used wherein such activity is desired, administration being e.g. orally or by injection. They are useful, for example, in treating vascular complications or irregularities, such as those associated with hypertension, etc., their function being to maintain normal conditions in the walls of the small blood vessels. Separation of the mixture of water-soluble hesperidins is not necessary, since they may be used with equal efficacy in the purified mixed form which contains a small quantity of methylated hesperidin chalcone.

The treatment or treatments according to the afore-described process cannnot, completely remove the undesired chalcone and, since the latter is yellow-colored, the products obtained according to the said process are slightly yellowish in color.

A primary object of the present invention is the embodiment of a procedure whereby methylated hesperidin chalcone can be completely removed from the product aforesaid or products treating the aqueous solution of the impure (i.e. chalcone-contaminated) product with an alkali metal bisulfite or ammonium bisulfite ($HSO_3^{--}$) or a reagent which is convertible into one of these in an aqueous solution, such as pyrosulfite ($S_2O_5^{--}$) or hydrosulfite ($S_2O_4^{--}$). For the said purpose, the above reagent ($HSO_3^{--}$-yielding agent) is added to an aqueous solution of the impure product. A similar effect also can be obtained by dissolving the crude product in an aqueous solution of alkali bicarbonate, and passing sulfur dioxide through the solution to form alkali bisulfite in the reaction system. And from the reaction mixture thus obtained the water-soluble methylhesperidins containing no chalcone derivatives may be separated. In this reaction, the methylated hesperidin chalcone forms an addition product with bisulfite, while the water-soluble methylhesperidins are hardly affected. The addition product is readily soluble in water and hardly soluble in organic solvents in general. Though the reaction conditions may be selected in accordance with the composition of the material, the amount of the reagent should generally be over 2 mols per mol of methylated hesperidin chalcone contained in the material. Most preferably 5 to 10 mols of the reagent are used. If other conditions are suitable, a further amount of the reagent may be employed. The reaction is preferably conducted at pH 5–7, and at a temperature not higher than 80° C. An advantageous temperature range is 20° to 80° C.

Whatever preferable conditions other than temperature may be selected, the yield of water-soluble methylhesperidin is lowered, or undesirable sulfur-containing by-products may be produced, if the reaction temperature is over 80° C. The reaction is generally completed within 2 to 3 hours and the end-point of the reaction can easily be detected by the disappearance of the yellowish color from the solution. If the pH-value and/or temperature is improper, the complete purification of the product cannot be attained—for example, (1) if the reaction is conducted e.g. at pH 4.4, the addition product is not produced even when the reaction is continued for about three weeks, and (2) if the reaction is conducted e.g. at 90° C., the purity of the water-soluble methylhesperidin remains at about 60–70%.

For extracting the purified water-soluble methylhesperidin, the reaction mixture is shaken with an organic solvent. As the organic solvent n-butanol may suitably be used, but a solvent which is not freely miscible with water such as isobutanol, sec.- or tert.-butanol, methyl ethyl ketone, etc. may also be employed. For collecting the water-soluble methylhesperidins from the extract, the solvent is distilled off preferably under reduced pressure, and the residue is recrystallized from a suitable solvent such as ethanol or isopropanol.

The above-disclosed process for separating methylated hesperidine chalcones as their bisulfite-addition products from water-soluble methylhesperidin is a peculiar method applicable only for the products of this invention. It may incidentally be noted in this regard that the removal of methylated hesperidin chalcone by known conventional means such as chromatography and the like is industrially impracticable inter alia because of the involved complicated and difficult manipulations.

The chalcone-free products of the invention have the aforedescribed vitamin P-like activity and are useful for the purposes and in the manner hereinbefore described in connection with the products containing some chalcone as obtained according to the prior Sakieki process.

The following examples illustrate and explain the actual working of the present invention, but are not intended to limit the scope thereof. Temperatures are uncorrected. Percentages are by weight. The relationship between parts by weight and parts by volume is as that between grams and milliliters.

*Example 1*

To a solution of 6.1 parts by weight of hesperidin (0.01 mol) in 25 parts by volume of 8% aqueous sodium hydroxide solution (0.05 mol), there are added dropwise 6.3 parts by weight of dimethyl sulfate (0.05 mol) with stirring and cooling to below 10° C. After being left standing overnight, the reaction mixture is adjusted to pH 5 and filtered, and the filtrate is saturated with sodium chloride, whereupon a resinous substance separates out. The resinous substance is dissolved in 20 parts by volume of distilled water and salted out again with sodium chloride. The substance is then concentrated to dryness under reduced pressure at a temperature below 60° C. and the residue is dissolved in 30 parts by volume of isopropyl alcohol. After decolorizing with 1 part by weight of activated charcoal, the solution is cooled with ice, when a crystalline substance separates out.

The resultant methylated product is washed several times with 20 parts by volume-portions of ether to obtain yellowish white crystalline powder melting at about 95° C.

A solution of 10 parts by weight of so-obtained methylated product (purity of water-soluble methylhesperidins, 65%) and 1.7 parts by weight of acidic sodium sulfite (NaHSO$_3$) in 75 parts by volume of water is kept at 70° C. for 2 hours. The solution is bright yellow at first but is gradually decolorized as the reaction proceeds. Ten parts by weight of sodium chloride are added to the reaction mixture, whereupon a white resinous substance is salted out. Recrystallization from isopropanol of the substance gives 5.8 parts by weight of colorless crystalline powder, the purity of which is 98.6% (by spectrometric examination). Methylhesperidin chalcones are not contained in the product.

*Example 2*

A solution of 6.1 parts by weight of hesperidin in 200 parts by volume of methanol is boiled with 15 parts by weight of methyl iodide and 3 parts by weight of potassium carbonate on a water-bath for 3 hours. After cooling the reaction mixture, undesirable inorganic compounds are removed by filtration and the filtrate is concentrated to dryness. Recrystallization from absolute ethanol of the residue gives 4.5 parts by weight of yellowish powder. This powder comprises 3'-methylhesperidin and 3,6'-dimethylhesperidin chalcone.

A solution of 20 parts by weight of so-obtained methylated product (purity of water soluble methylhesperidins, 93%) and 3.3 parts by weight of sodium pyrosulfite in 80 parts by volume of water is adjusted to pH 6.0 with sodium bicarbonate and kept standing for 2 hours at 40° C. The reaction mixture is extracted with four 50 parts by volume-portions of n-butanol and the combined extracts are concentrated to dryness under reduced pressure. Recrystallization from isopropyl alcohol of the residue gives 15 parts by weight of colorless crystalline powder. The purity is 98.5%.

*Example 3*

To a suspension of 6.1 parts by weight of hesperidin in 200 parts by volume of methanol is added an ethereal solution of diazomethane produced from 30 parts by weight of nitrosomethylurea; the reaction proceeds slowly, evolving N$_2$ gas. After the reaction is continued for 48 hours with shaking, unreacted hesperidin is separated by filtration and the filtrate is concentrated to dryness. Recrystallization from isopropanol of the residue gives 2 parts by weight of pale yellow powder, which contains 3'-methylhesperidin as the main component and small amounts of 3',5-dimethylhesperidin and 3,6'-dimethylhesperidin chalcone.

A solution of 10 parts by weight of so-obtained methylated product (purity of water soluble methylhesperidins, 90%) and 1.5 parts by weight of sodium hyposulfite in 40 parts by volume of water is kept standing for 6 hours at room temperature (20–25° C.). The same treatment as in the last paragraph of Example 2 of the reaction mixture gives water-soluble methylhesperidins, the purity of which is higher than 95%. Methylhesperidin chalcones are not contained in the product.

Having thus disclosed the invention what is claimed is:

1. A process for producing chalcone-free water-soluble methylhesperidins representable by the formula

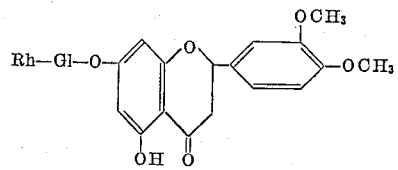

wherein R is a member selected from the group consisting of hydrogen and methyl, Rh is a member selected from the group consisting of rhamnose and methylrhamnose and Gl is a member selected from the group consisting of glucose and methylglucose, which comprises methylating hesperidin, and removing chalcone admixed in the obtained reaction product as its addition product with a member selected from the group consisting of alkali metal and ammonium bisulfites, pyrosulfites and hydrosulfites.

2. A method of eleminating methylated hesperidin chalcone from water-soluble methylhesperidin contaminated therewith, which comprises dissolving the chalcone-contaminated methylhesperidin in water, adding an $HSO_3^{--}$-yielding agent, maintaining the mixture at pH 5 to 7 and at a temperature not in excess of 80° C., and recovering the methylhesperidin free from chalcone contaminant.

3. A method according to claim 2, wherein the bisulfite ion-yielding agent is sodium bisulfite.

4. A method according to claim 2, wherein the bisulfite ion-yielding agent is sodium pyrosulfite.

5. A method according to claim 2, wherein the bisulfite ion-yielding agent is sodium hyposulfite.

References Cited in the file of this patent

UNITED STATES PATENTS

| | | |
|---|---|---|
| 2,425,291 | Wilson | Aug. 5, 1947 |
| 2,615,015 | Wilson | Oct. 21, 1952 |